United States Patent [19]

Stevens et al.

[11] Patent Number: 4,709,545
[45] Date of Patent: Dec. 1, 1987

[54] BEARING COMPARTMENT PROTECTION SYSTEM

[75] Inventors: Leonard W. Stevens, Vernon; William S. Siwik, Manchester; William A. Moore, Durham; Wayne M. Brown, North Granby; Andrew A. Barnard, Glastonbury, all of Conn.

[73] Assignee: United Technologies Corporation, Hartford, Conn.

[21] Appl. No.: 816,693

[22] Filed: Jan. 6, 1986

Related U.S. Application Data

[63] Continuation of Ser. No. 499,633, May 31, 1983, abandoned.

[51] Int. Cl.[4] .............................. F02C 7/12; F02C 7/28
[52] U.S. Cl. .................................. 60/39.08; 60/39.83
[58] Field of Search ................ 60/39.07, 39.08, 39.75, 60/39.83; 184/6.11; 277/22; 384/139, 142, 143, 320; 415/111, 112, 170 R, 170 A, 175, 176, 177

[56] References Cited

U.S. PATENT DOCUMENTS

| | | | |
|---|---|---|---|
| 2,639,579 | 5/1953 | Willgoos | 60/39.08 |
| 2,951,337 | 9/1960 | Atkinson et al. | 60/39.08 |
| 2,992,842 | 7/1961 | Shevchenko | 277/25 |
| 3,360,239 | 12/1967 | Swearingen | 415/177 X |
| 3,393,024 | 7/1968 | Rhodes et al. | 415/112 |
| 3,490,746 | 1/1970 | Bell, III | 415/177 |
| 3,768,921 | 10/1973 | Brown et al. | 415/178 |
| 3,884,041 | 5/1975 | Zerlauth | 60/39.08 X |
| 3,999,376 | 12/1976 | Jeryan et al. | 416/241 B |
| 4,046,223 | 9/1977 | McHugh | 60/39.08 |
| 4,086,759 | 5/1978 | Karstensen et al. | 60/39.08 |
| 4,156,342 | 5/1979 | Korta et al. | 415/112 |
| 4,254,618 | 3/1981 | Elovic | 60/226.1 |
| 4,337,983 | 7/1982 | Hibner | 308/187.1 |
| 4,451,200 | 5/1984 | Libertini et al. | 415/111 |

Primary Examiner—Louis J. Casaregola
Attorney, Agent, or Firm—Norman Friedland

[57] ABSTRACT

A buffer zone adjacent to the inner diameter of carbon seals of an enclosed bearing compartment is defined by an elongated element disposed adjacent the shaft of a turbine type power plant is open ended to receive pressurized, cool air bled from the compressor to apply the cooler, higher pressure air (higher than ambient) adjacent to the seal. One embodiment contemplates feeding the buffer zone by pipes and another embodiment shrouds the bearing compartment and flows the shrouded air to the buffer zone. The buffer air with other secondary airflow cooling requirements, is utilized to cool the high pressure turbine with an overall engine performance benefit.

6 Claims, 3 Drawing Figures

BEARING COMPARTMENT PROTECTION SYSTEM

CROSS REFERENCE

This application is also a continuation of application Ser. No. 499,633 filed May 31, 1983 (also abandoned).

This patent application is related to the subject matter in U.S. patent application entitled BEARING COMPARTMENT PROTECTION SYSTEM filed on even date by Robert L. Putnam, Ser. No. 06/499,634, (abandoned) and assigned to the same assignee of this patent application.

TECHNICAL FIELD

This invention relates to gas turbine power plants for powering aircraft and particularly to means for buffering the bearings mounted in proximity to the hot section of the power plant.

BACKGROUND ART

In recent years, the industry has been undertaking an intensive effort in designing, developing and manufacturing power plants that exhibited a high trust specific fuel consumption (TSFC). To this end it is desirous to operate the engine during at least a portion of its operating envelope at a temperature higher than has heretofore been achieved. One of the consequences of these "hotter" engines is that the mid-frame bearings supporting the rotating machinery is disposed in a hotter and higher pressure environment than similar sections in other engines have heretofore been encountered.

Coincidental with disposing the bearings in a hotter environment, outside bearing compartment presssures have risen attendantly. The consequences of these conditions, namely hotter and higher pressure environment and pressurized bearing compartment could result in an undsirable condition with the bearing compartment, which many manifest in fires and degradation of the components.

While the industry has provided buffer means for bearings in heretofore known engines, such systems flow air at a lower temperature and much lower pressure and/or cooler air at the same pressure into a cavity surrounding the bearing or in close proximity thereto. For such heretofore known systems to work satisfactorily it is necessary to continuously flow the air to lower pressure areas of the engine in order to generate sufficiently lower pressure at the seal adjacent the bearing compartment. In some installations it was also necessary to vent the excess flow overboard. Whether that air is being vented overboard or routed to a lower pressure area, by bypassing the high pressure turbine, the use of the air in this manner results in an overall loss in engine performance. To obtain the proper pressure in these heretofore designs it is necessary to create a pressure drop by the use of seals and in practice these seals are typically of the labyrinth design. Obviously, the constant wear of these seals adversely affect the pressure drop valve and hence flow.

Thus, these heretofore known systems incur disadvantages requiring a substantial amount of air to buffer the external surfaces of the bearing compartment and discharging the buffer air to lower ending pressures or overboard and requiring pressure reducing seals.

This invention serves to solve the particular problem enumerated above by providing a high pressure, cooler air buffer zone for a bearing that is encapsulated adjacent to the combustion section. We have found that we can obtain a satisfactory environment that minimizes the likelihood of inadvertent fires in the area of the bearings by applying adjacent to the seals of the bearing compartment high pressure compressor air that has been cooled to some temperature below the flash point of the oil/air mixture associated with the bearing cooling and lubrication system. The pressure of the buffer air is slightly higher than the hotter ambient air so that the hotter air will not migrate to the bearing compartment in the event of the seal malfunctioning. It is contemplated that the cooled compressor bleed air is fed to a buffer zone formed adjacent to the carbon seals of the bearing compartment. The buffer zone is defined by an elongated annular space defined between the rotating shaft and a stationary annular, radially spaced, parallelly disposed extension number. This member being open ended so that flow admitted to said buffer zone intermediate the ends thereof flows axially in either direciton with a preference of flowing toward the radial seal disposed on one of said ends.

In one of the preferred embodiments the buffer zone is fed by at least one pipe (preferably two) for each of the buffer zones associated with the pair of carbon seals. In another embodiment the bearing compartment is shrouded defining an annular passage feeding the buffer zone, which passage cools the entire bearing compartment surface. The second outer shroud forms a heat shield by surrounding the annular passage and is dead-ended to provide an insulation of dead air.

It is contemplated by this invention that the air bled from the compressor to buffer the bearing compartment is utilized downstream of the engine in a manner that will not adversely penalize the engine's performance.

Notwithstanding the fact that the compressor air routed to the bearing compartment has been heated to some degree in its contact with the combustor environment, the air still is sufficiently cool to be useful in cooling the hot high turbine rotor. And since the pressure of this air is sufficiently high to be compatible with the pressure in the high turbine environment, it is routed there to scrub this hot section. In engines that employ tangential on board injectors (TOBI) for cooling the high turbine rotor, the advantages of utilizing this invention results in utilizing less TOBI air than would otherwise be necessary. It is possible, because of the relative low temperature of the air from the buffer to the TOBI air, a significant savings in the use of the overall cooling air for the high pressure turbine may be realized. For a complete description of a TOBI refrence should be made to U.S. Pat. No. 3,768,921 granted to W. M. Brown and W. A Grace on Oct. 30, 1973 and assigned to the same assignee as this patent application.

DISCLOSURE OF INVENTION

An object of this invention is to provide for a gas turbine engine, means for buffering the bearing compartment so as to insulate this compartment from the hotter environment in close proximity thereto. A feature of this invention is to supply high pressure air from the compressor after first passing said air through a heat exchanger to cool the air to surround and buffer the bearing compartment seals. A feature of this invention is the open ended buffer zone adjacent the bearing compartment seals that admit both buffer air and environment air into the compartment in the event of a seal malfunction which air does not adversely affect the bearing and its components. Another feature is achieving temperature buffering without the use of labyrinth seals and the adverse conditions associated with the use of seals.

The higher pressure buffer air overflows relative to the needs of the compartment carbon seals, precluding the hot surrounding air from entering the carbon seal leakage. Since the knife edge labyrinth seals are no longer necessary, whose clearance increases upon engine operation, the buffering system becomes insensitive to seal rubs and therefore effectuates a greater degree of safety against fires which would otherwise occur due to normal engine operation deterioration.

A still further feature of this invention is to utilize the high pressure, cooler buffer air to cool the high pressure turbine resulting in an effective use of compressor air utilized for cooling purposes without incurring an engine operating penalty.

Other features and advantages will be apparent from the specification and claims and from the accompanying drawings which illustrate an embodiment of the invention.

BRIEF DESCRIPTION OF DRAWINGS(S)

BEST MODE FOR CARRYING OUT THE INVENTION

Figure 1:
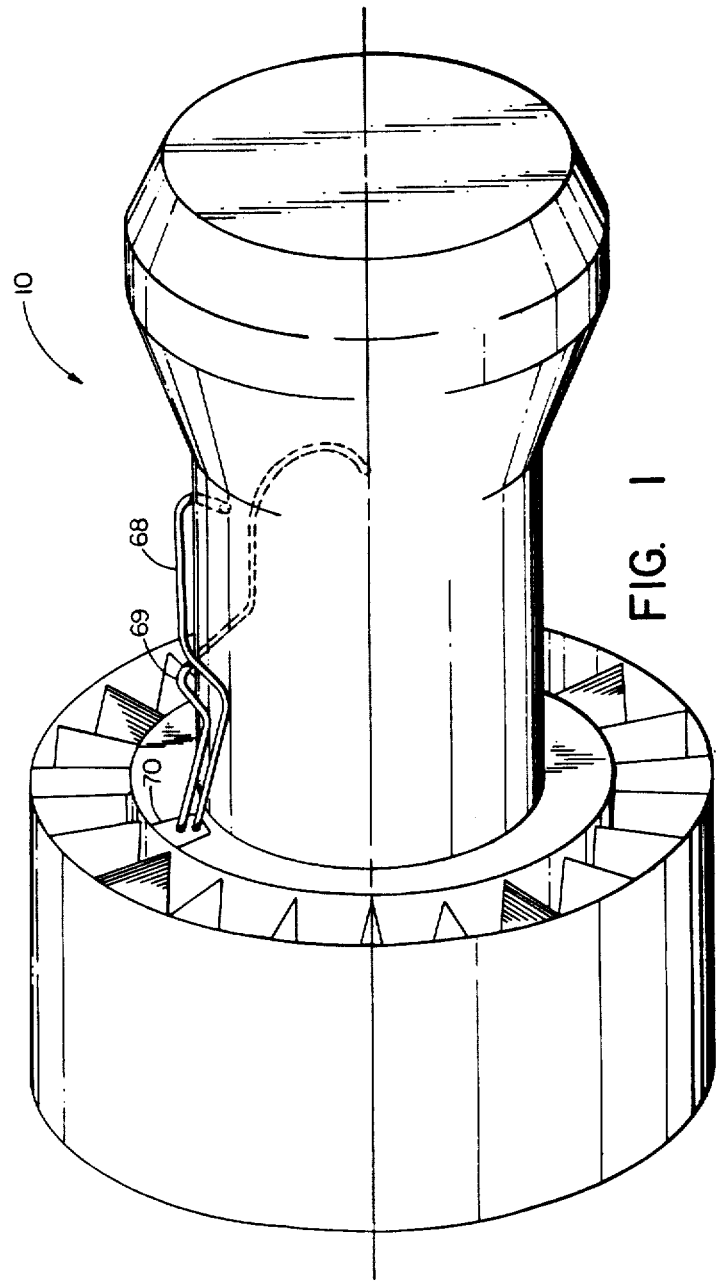
FIG. 1 is a schematic and perspective view of a gas turbine engine with the heat exchanger utilized to cool the compressor air prior to being returned as the buffer air.
Figure 2:
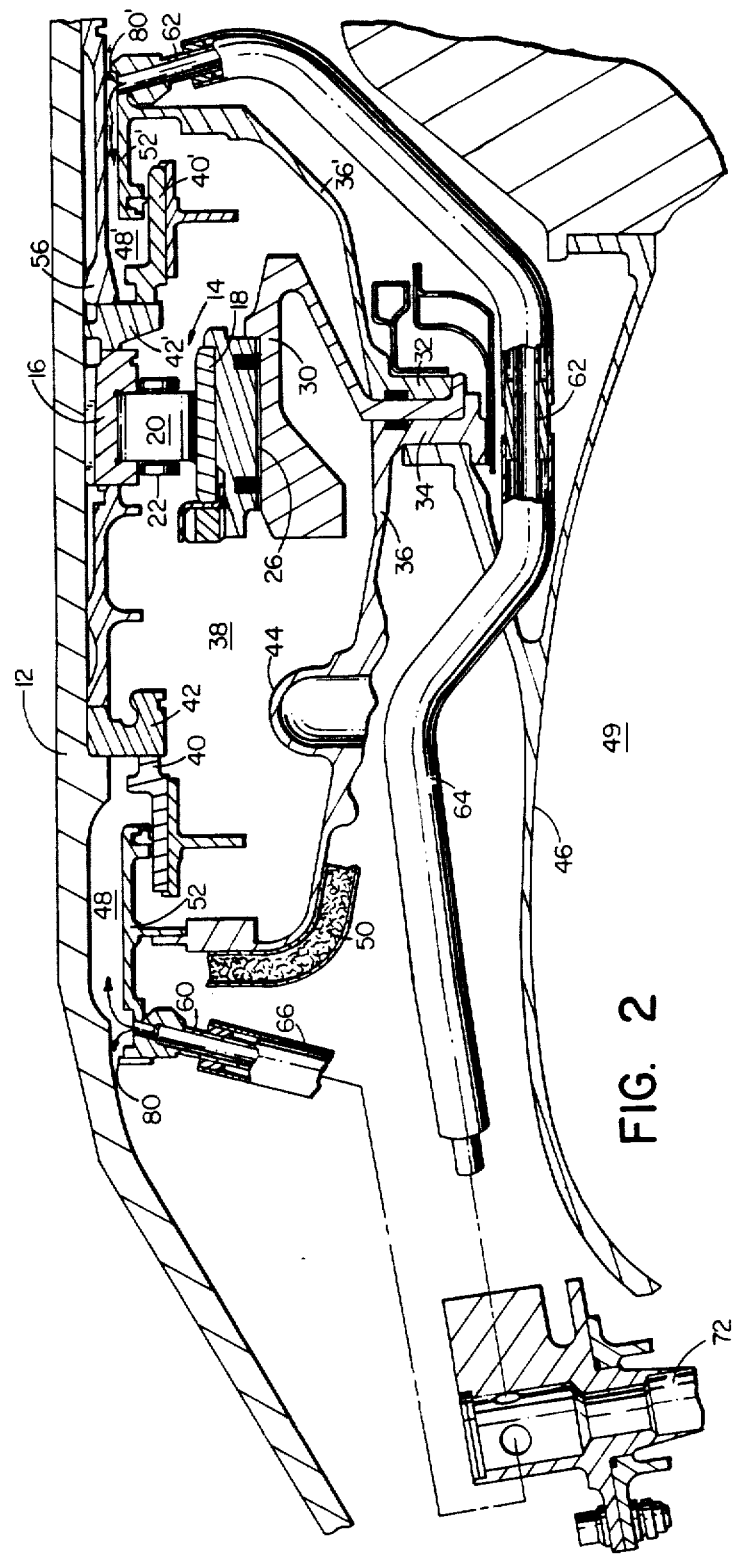
FIG. 2 is a fragmentary view partly in section and partly in schematic showing a first embodiment of this invention.

The invention can best be understood by referring to FIGS. 1 & 2, showing a typical fan jet engine generally indicated by reference numeral 10, having a fan section, compressor section, combustor section, turbine section and exhaust section. For the sake of simplicity and convenient, the details of a suitable gas turbine engine is omitted herefrom but reference should be made to the JT-9D engine manufactured by Pratt & Whitney Aircraft of United Technologies Corporation, the assignee of this patent application.

Suffice it to say that the power plant comprises a twin spool having axial flow compressor section II and turbine section B stages, where each set of stages of the compressor and turbines are interconnected by a shaft. The burner section is disposed between the compressor and turbine sections for developing sufficient energy to power the turbine and develop thrust for propulsion. As noted in more detail in FIG. 2, the high pressure spool or gas generator (not shown) consists of shaft 12 suitably supported by roller bearings generally indicated by reference numeral 14. These bearings are well known and consists of an inner ring 16 mounted adjacent shaft 12, an outer ring 18, a plurality of rollers 20 and cage 22 and, in this instant, are surrounded by fluid damper 26. The damper and bearng are, in turn, supported and grounded to the annular support member 30 which is supported between flanges 32 & 34 of the bearing case 36 and 36'. Bearing case 36 & 36' encapsulates the bearing 14. For more details of a bearing and fluid damper construction reference should be made to U.S. Pat. No. 4,337,983 granted to D. H. Hibner on July 6, 1983 and U.S. Pat. No. 4,385,788 granted to P. F. Brown, Jr. et al on May 31, 1983, both of which are assigned to the same assignee as this patent application and which are both incorporated herein by reference.

As is apparent from the foregoing the bearing is encapsulated in the cavity or bearing compartment 38 defined by casing 36 and 36' surrounding the shaft 12. The ends of the compartment 38 are sealed by suitable carbon seals 40 and 40' which are spring loaded (not shown) against the face of the seal plates 42 and 42' respectively. The construction of the carbon seals are well known and an example of a suitable construction is shown in U.S. Pat. No. 2,992,842 grated to Shevchenko et al on July 18, 1961 also assigned to the same assignee as this patent application and incorporated herein by reference.

As is well known, the bearing compartment 38 is continuously subjected to the flow of oil which serves to lubricate and cool the bearings which oil is returned through return line 44 mounted on the bottom of bearing casing 36 and 36'.

In this installation the bearing casing 36 and 36' is supported to the diffuser case partially shown as reference numeral 46 which surrounds the burner liner (not shown) and defines therewith a cavity 49 that surrounds and shrouds the burner liner. Since the bearing compartment is radially disposed relative to the combustor and is exposed to the already heated compressor discharge air surrounding the bearing compartment, under certain operating conditions this location of the engine has the propensity of becoming extremely hot.

One method of insulating the bearing compartment 38 from this excessive heat is by wrapping an insulating blanket 50 of suitable material (partially shown) around the casing 36 and 36.

In addition thereto or as an alternate to the insulation system a buffer zone is disposed at the inside diameter of the carbon seals. This buffer zone is supplied with a cool, high pressure air bled from the compressor. The temperature of this air is cooler and at a higher pressure than the ambient air surrounding the bearing compartment. While this system prevents hot air from entering the bearing compartment under normal operating conditions, in the event of an inadvertent leakage of the seal, the hotter ambient air is likewise prevented from entering into the bearing compartment, without first being mixed with buffer air. In the embodiment shown in FIG. 2, the cooler pressurized air is introduced at the inner diameter of the carbon seal in the annulus 48 and 48' defining buffer zones by pipes 60 and 62 to fill the spaces between the shaft 12, seal support structure 52 up to the seal plate 42 on the left hand side of the bearing 14 and between the sleeve 56, seal support 52' up to the seal plate 42', on the right had side of bearing 14. While only a single feed line is shown on either side of the bearing, each side may carry more than one pipe, (two pipes spaced 180° apart are preferred in this embodiment).

Pipes 60 and 62 are concentrically mounted in outer tubes 66 & 64, respectively, which serve to insulate the inner pipe and maintain the air flowing to the buffer zone at a proper temperature level. The cooler pressurized air, as can be seen from FIG. 1, is bled from a suitable station in the compressor section, routed outside of the engine via line 68, through the fan heat exchanger 70 and returned internally via line 69 to the pipes 60 and 62 through manifold 72, (FIG. 2).

As noted from FIG. 2, the air feeding the buffer zone 48 and 48' which virtually is an annular chamber surrounding the shaft that feeds the leakage path across the carbon seals 40 and 40' is introduced at a point that is remote from the carbon seals. It will be appreciated that buffer zones 48 and 48' are both open ended chambers where buffer air can flow out through the carbon seal or through the gaps 80 and 80'. However because of the proper selection of the pressure of buffer air some portion of this air will always flow toward the carbon seal while the remaining portion of this air flows out of the buffer zone 48 and 48' through the gaps 80 and 80'. The amount of air required by a carbon seal is minimal relative to that supplied to the buffer zone during normal operation. The excess flow flows out gap 80. Under abnormal seal "stuck" or failure of the carbon seal, the total buffer flow and possibly some hot environmental air would leak into the compartment without major fire and possibly catastrophic failure consequences. The excess air under normal operation is used to supply air to the high turbine blads. The blades are not over serviced because (1) air normally used say, through the TOBI, to service blades has been reduced and (2) further reduction of this TOBI air is possible because excess air from the buffer zone is cooler. By virtue of this invention a performance benefit is realized.

Figure 3:
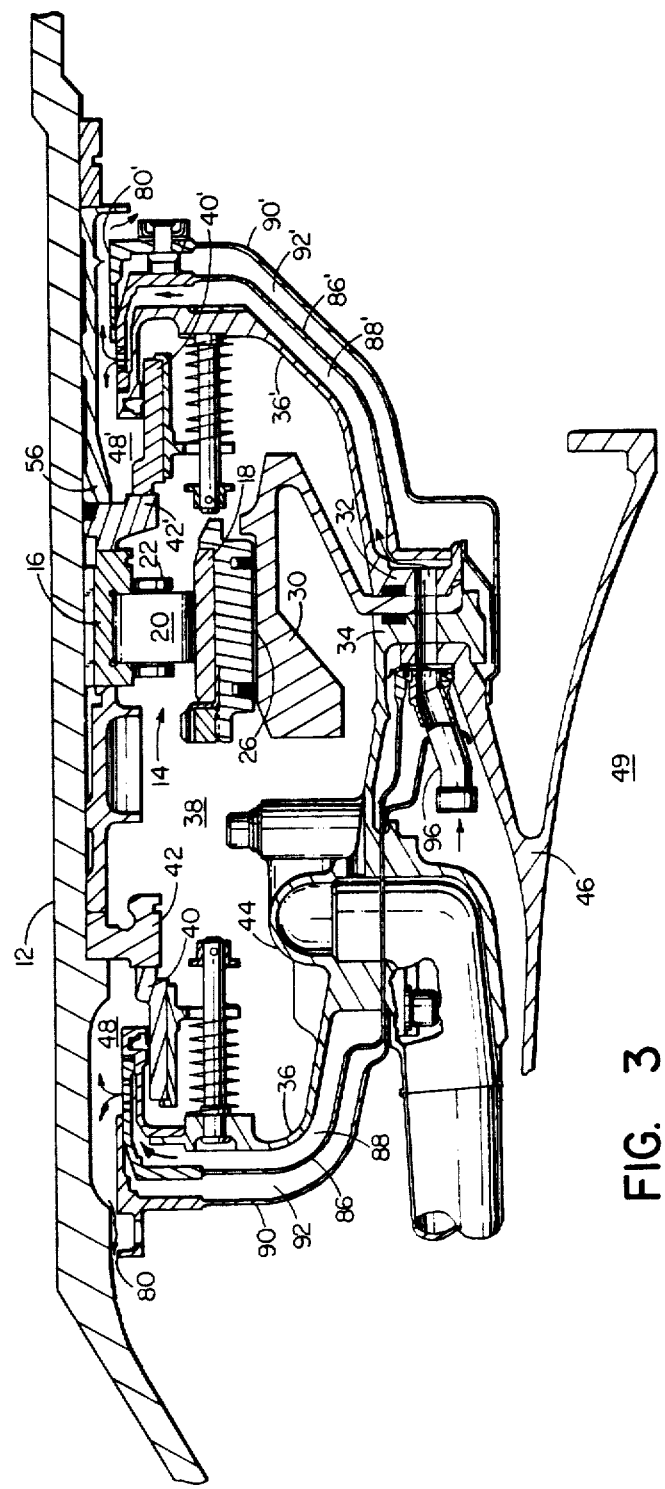
FIG. 3 is a fragmentary view partly in section and partly in shematic showing another embodiment of this invention.

FIG. 3 exemplifies another embodiment of this invention and like-reference numerals refer to like parts. In this embodiment the encapsulated bearing compartment is enclosed on virtually both the left and right hand sides with sheet metal sheaths 86 and 86' spaced therefrom to define annular chambers 88 and 88'. A second left and right hand side sheath 90 and 90' encapsulate the entire unit and is spaced from the inner sheath 86 and 86' to define annular spaces 92 and 92'. The outer annular spaces 92 and 92' are dead ended and provide a dead air space that serve as an insulating blanket for the bearing compartment. This minimizes heat transfer from the hotter air surrounding the compartment to the oil in the bearing compartment.

As was the case of the system in FIG. 2, the system in FIG. 3 receives the higher pressure, cooler air from the heat exchanger and is fed into conduit 96 that serves as a manifold to feed the annular spaces 88 and 88' which in turn feeds the buffer zones 48 and 48'. Also, like the system in FIG. 2, the buffer zones are open-ended and do not require closely held labyrinth seals to contain the buffer air and prevent hot enviromental air polution in close proximity of the carbon seals.

By maintaining the pressure at the buffer zone at a higher value than the ambient air surrounding the encapsulated bearing compartment, leakage of the hotter environmental air into the bearing compartment is thwarted by the higher pressure cooler air in the buffer zone. This, obviously, negates the possiblity of the oil in the bearing compartment mixing with the hotter air, which could result in an adverse condition.

By utilizing some of the high pressure air, for example, the air at the discharge end of the compressor, and then cooling that air prior to being admitted into the buffer zone, the system can be satisfied with the proper pressure and temperature air.

In addition to the advantage of using a small amount of bleed air which contrasts from heretofore buffer systems that continuously feed cooler air (not pressurized) and relies on the quantity flowing over the bearing for maintaining the cooling and buffering effort, this system affords other advantages, though not limited thereto.

It reduces the potential for bearing compartment fires by reducing the carbon seal leakage air temperature significantly.

It provides cold air at high pressures to buffer the compartment; the buffer air temperature is colder for a given pressure level than air directly drawn off the compressor system.

It increases the compartment environment pressure at which you can safely operate the bearing compartment.

In the event of a carbon seal failure, there is sufficient cold buffer air supplied to prevent a compartment oil fire.

Under normal operating conditions the excess buffer flow can be used to cool the high pressure turbine blades. This cooler air reduces the flow requirements needed from other sources as from the TOBI and augments the performance benefits.

By using a high pressure source and metering the flow, normal small variations in buffer cavity pressures produce insignificant variations in buffer flow.

It should be understood that the invention is not limited to the particular embodiments shown and described herein, but that various changes and modifications may be made without departing from the spirit and scope of this novel concept as defined by the following claims.

What is claimed is:

1. For a gas turbine engine having a compressor, and a turbine and shaft interconnecting said compressor and said turbine, a bearing compartment housing a bearing supporting said shaft interconnecting the turbine and compressor located in an environment of hot engine air, said bearing compartment surrounding said shaft and having carbon contact sealing means surrounding said shaft mounted at the ends thereof in close proximity to said shaft, wall means defining open ended chambers defining buffer zones surrounding said shaft adjacent said carbon contact sealing means for receiving buffer air, a source of air extracted from said compressor, fluid connecting means for leading buffer air from said source to a point external of said engine into each of said buffer zones at a point in direct communication with the open end of a chamber so that a portion of said buffer air flows out of each of said open ends of said chambers and into said turbine for cooling purposes, said buffer air being at a pressure higher than the pressure of said hot air in said environment so that a small portion of the buffer air leaks through said carbon seal, and the remaining portion is directed toward said turbine heat exchanger means intermediate said source and said buffer zones for coolign the buffer air prior to being admitted into said buffer azones and the buffer air normally flowing out of said open end flows into said bearing compartment in the event of a failure of said carbon contact sealing means.

2. For a gas turbine engine as in claim 1 wherein said fluid connecting means includes at least one pipe internall of said engine receiving buffer air from said heat exchanger connecting each of said chambers at a point intermediate the ends thereof.

3. For a gas turbine engine as in claim 2 wherein each of said pipes are concentrically mounted in an outer pipe radially spaced therefrom providing a dead air space for insulating the buffer air in each of said pipes.

4. For a gas turbine engine as in claim 1 wherein said fluid connecting means includes a sheath surrounding said bearing compartment and spaced therefrom for defining an annular passageway for receiving buffer air, said buffer air first scrubbing said bearing compartment prior to being admitted into said open ended chamber.

5. For a gas turbine engine as in claim 4 including openings in said wall means of said open ended chambers interconnecting said annular passageway and said open ended chambers at a point intermediate the ends of said open ended chambers.

6. For a gas turbine egine as in claim 5 including a second sheat surrounding the other sheath but spaced therefrom defining a dead-ended annular chamber for insulating the buffer air in said other sheath.

* * * * *

UNITED STATES PATENT AND TRADEMARK OFFICE
CERTIFICATE OF CORRECTION

PATENT NO. : 4,709,545

DATED : December 1, 1987

INVENTOR(S) : LEONARD W. STEVENS ET AL

It is certified that error appears in the above-identified patent and that said Letters Patent is hereby corrected as shown below:

| | |
|---|---|
| Column 1, Line 38 | Change "undsirable" to --undesirable-- |
| Column 1, Line 64 | Change "ending" to --engine-- |
| Column 2, Line 21 | Change "direciton" to --direction-- |
| Column 3, Line 49 | Change "II" to --11-- |
| Column 3, Line 50 | Change "B" to --13-- |
| Column 3, Line 62 | Change "bearng" to --bearing-- |
| Column 4, Line 55 | Change "had" to --hand-- |
| Column 6, Line 52 | Change "coolign" to --cooling-- |
| Column 6, Line 53 | Change "azones" to --zones-- |
| Column 6, Line 58/9 | Change "internall" to --internally-- |

Signed and Sealed this

Seventh Day of June, 1988

Attest:

DONALD J. QUIGG

*Attesting Officer*

*Commissioner of Patents and Trademarks*